(12) United States Patent
Sano et al.

(10) Patent No.: US 8,130,329 B2
(45) Date of Patent: Mar. 6, 2012

(54) MONITOR APPARATUS

(75) Inventors: Noriyuki Sano, Nikko (JP); Hideto Katsunuma, Iwaki (JP); Naotoshi Endo, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1342 days.

(21) Appl. No.: 11/625,652

(22) Filed: Jan. 22, 2007

(65) Prior Publication Data

US 2007/0176891 A1 Aug. 2, 2007

(30) Foreign Application Priority Data

Jan. 23, 2006 (JP) ................................. 2006-014047

(51) Int. Cl.
*H04N 5/64* (2006.01)
(52) U.S. Cl. ........................................ 348/837; 348/836
(58) Field of Classification Search .................. 348/836, 348/837; 345/156
See application file for complete search history.

(56) References Cited

U.S. PATENT DOCUMENTS

| | | | |
|---|---|---|---|
| 6,049,288 A * | 4/2000 | Kawasaki | 340/815.4 |
| 6,424,386 B1 * | 7/2002 | Shimizu | 348/837 |
| 6,816,177 B2 * | 11/2004 | Wang et al. | 345/156 |
| 2003/0142064 A1 | 7/2003 | Wang et al. | |

FOREIGN PATENT DOCUMENTS

| | | |
|---|---|---|
| JP | 05-096999 | 4/1993 |
| JP | 06-183302 | 7/1994 |
| JP | 10-117310 | 5/1998 |
| JP | 3089096 | 7/2000 |
| JP | 2004-103676 | 4/2004 |
| JP | 2005-088644 | 4/2005 |
| JP | 2005-231572 | 9/2005 |

* cited by examiner

*Primary Examiner* — Basil Katcheves
(74) *Attorney, Agent, or Firm* — Brinks Hofer Gilson & Lione

(57) ABSTRACT

A monitor apparatus includes a display panel housed in a housed position, a driving section, a detecting section, and a controlling section. The driving section includes a gear transmission mechanism for driving the display panel and causes the display panel to perform a first operation in which the display panel is moved from the housed position to an upright position via a horizontal position and a second operation in which the display panel is lowered from the upright position and is drawn into the housed position via the horizontal position. The detecting section detects when an external force is applied to the display panel placed in the upright position. When the detecting section detects that an external force is applied, the controlling section causes the driving section to drive the display panel in a direction in which the external force was applied.

22 Claims, 15 Drawing Sheets

MONITOR APPARATUS

RELATED APPLICATIONS

The present application claims priority to Japanese Patent Application Number 2006-014047, filed Jan. 23, 2006, the entirety of which is hereby incorporated by reference.

BACKGROUND

1. Technical Field

The present invention relates to a monitor apparatus mounted in a vehicle to display television programs, vehicle-travel information, and so on.

2. Background Information

Conventionally, monitor apparatuses for television or the like are accommodated in the dashboards of vehicles so that passengers can view the display portions (i.e., the screens) of the display panels. Such a known monitor apparatus has a housing installed in the vehicle dashboard, a slide body housed in the housing so that it can advance and retract, and a display panel pivotably attached to the slide body by using one end portion of the display panel as a pivot supporting point. The display panel can be shifted between a housed position in which the display panel is housed within the housing, a horizontal position in which the display panel projects from the housed position toward the front side of the housing, and an upright position in which the display panel is pivotably raised from the horizontal position. pivotably The known monitor apparatus includes a gear transmission mechanism, arm members, pins, and so on. The gear transmission mechanism is driven by a drive source (a motor) to cause the slide body to move and to cause the display panel to pivot. The arm members, the pins, and so on are engaged with each other between the slide body and the display panel. The slide body, the drive source, the gear transmission mechanism, the arm members, the pins, and so on constitute a driving section for movably driving the display panel.

The driving section allows the display panel to shift from the housed position to the horizontal position in which the display panel projects forward from the housing and to pivotably rise from the horizontal position to the upright position, and also allow the display panel to pivotably lower from the upright position to the horizontal position and to shift from the horizontal position to the housed position in which the display panel is drawn into the housing (refer to Japanese Patent No. 3089096).

However, when the display panel of the known monitor apparatus is in the upright position, it is susceptible to an external force, such as a force due to a passenger's inadvertent contact, or a force intentionally induced by pushing or pulling down when the passenger operates an air-conditioner operation switch located behind the display panel or when the passenger adjusts the angle of the display panel to an easy-to-view position.

Since such an external force is transmitted to the driving section through the display panel, the driving section may be damaged and the life of the driving section may be reduced. Since the driving section includes the gear transmission mechanism, a high load due to an external force applied to the display panel is applied to the gears of the gear transmission mechanism, which may thus cause loss of gear teeth, increase gear wear, and shorten the life of the gear transmission mechanism.

Additionally, the gear transmission mechanism may have a slipping section (or slipping means). In this case, when the slipping section is in operation, a continuous high load due to an external force is repeatedly applied to the gear transmission mechanism to thereby increase gear wear and to shorten the life of the gear transmission mechanism. In addition, the repeated slip operation of the slipping section increases the wear on components constituting the slipping section, thereby reducing a transmissible torque, inhibiting the gear transmission, and increasing the play in the entire gear train. This makes it difficult to smoothly perform the pivoting operation of the display panel. Additionally, since the display panel receiving an external force is maintained at its position, there is a problem in that it is difficult to view the screen of the display panel.

SUMMARY OF INVENTION

The present invention has been made in view of such drawbacks of the related art, and an object of the present invention is to provide a long-life monitor apparatus by reducing damage and wear of the driving section thereof The present invention provides a monitor apparatus. The monitor apparatus includes a display panel, a driving section, a detecting section, and a controlling section. The display panel is housed in a housed position. The driving section includes a gear transmission mechanism for driving the display panel and causes the display panel to perform a first operation in which the display panel is raised from the housed position to an upright position via a horizontal position in which the display panel projects from the housed position, and a second operation in which the display panel is lowered from the upright position and is drawn into the housed position via the horizontal position. The detecting section detects whether an external force is applied to the display panel while in the upright position. When the detecting section detects that an external force is applied to the display panel in the upright position, the controlling section causes the driving section to drive the display panel in a direction in which the external force was applied.

With this arrangement, when an external force is applied to the display panel in the upright position, the detecting section detects the external force and the controlling section causes the driving section to move the display in the direction in which the external force was applied, Thus, when an external force is applied to the display panel inadvertently or intentionally, the controlling section causes the driving section to control the movement of the display panel in the direction in which the external force is applied thereto. This arrangement can reduce damage and wear of the driving section and thus can provide a long-life monitor apparatus.

The detecting section is capable of detecting an external force applied in the directions in which the display panel is pushed down or pulled down. When an external force in the push down direction is applied to the display panel, the detecting section can detect that the external force in the push down direction is applied and the controlling section can cause the driving section to drive the display panel in the push down direction. When an external force in the pull down direction is applied to the display panel, the detecting section can detect that the external force in the pull down direction is applied and the controlling section can cause the driving section to drive the display panel in the pull down direction.

With this arrangement, when an external force in the direction in which it pushes down or pulls down the display panel is applied thereto, the movement of the display panel can be controlled through the driving section. This arrangement, therefore, can reduce damage and wear of the driving section and can provide a long-life monitor apparatus.

Preferably, the gear transmission mechanism includes a rotation gear train including a plurality of rotatable gears. Preferably, the detecting section is provided with at least one of the gears to detect, through rotation of the at least one gear, that the external force is applied to the display panel.

With this arrangement, the controlling section reduces the strength of a load due to an external force applied to the gears of the gear transmission mechanism, eliminates loss of gear teeth, and reduces gear wear, thus making it possible to provide a long-life gear transmission mechanism The gears of the gear transmission mechanism can be used for detection. Thus, it is possible to simplify the configuration of the detecting section without increasing the component count, and it is also possible to increase the detection accuracy of the detecting section, because the gear rotation is used for the detection.

Preferably, the plurality of gears includes a first gear and a second gear and has a clutching section for causing a slip when a load having a predetermined torque or more is applied. The clutching section has a clutch-equipped gear provided between the first gear and the second gear. Preferably, the detecting section is provided with the clutch-equipped gear or at least one of the gears other than the clutch-equipped gear.

With this arrangement, when a load having a predetermined rotational torque or more is applied, the clutch-equipped gear loses traction to eliminate loss of gear teeth. In addition, the provision of the controlling section can reduce the slip operation of the clutch-equipped gear, reduce wear of the components constituting the slipping section, maintain a transmittable high torque for a long period of time, and reduce play in the entire gear transmission train. Consequently, it is possible to provide a monitor apparatus in which the pivot operation of the display panel is stable for a long period of time.

When the external force is applied to the display panel while it is placed in the upright position, the controlling section may cause the display panel to move until a preset time is reached. With this arrangement, a desired tilt angle in the movable range of the display panel can be set in accordance with the preset time, and an arbitrary angle in the movable range can be selected.

After the display panel is moved by the controlling section until the preset time is reached, the driving section may return the display panel to its position before the application of the external force. With this arrangement, the display panel automatically returns to the original position, thus enhancing usability.

When the external force is applied to the display panel while it is placed in the upright position, the controlling section may cause the display panel to move in a preset range of angles. With this arrangements a desired tilt angle in the movable range of the display panel can be freely set and an arbitrary angle in the movable range can be selected.

After the display panel is moved in the preset range of angles by the controlling section, the driving section may return the display panel to its position before the application of the external force. With this arrangement, the display panel automatically returns to the original position, thus enhancing usability.

The display panel is capable of performing an operation for rising from the horizontal position to a maximum tilt position in which a tilt angle of the display panel is the largest when an external force in the push down direction is applied to the display panel while it is in an upright position other than the maximum tilt position, the controlling section can cause the display panel to move to the maximum tilt position With this arrangement, a sensor can be used to stop the movement of the display panel at its maximum tilt position, which can reduce component count and can reduce the cost.

After the display panel is moved to the maximum tilt position by the controlling section, the driving section may return the display panel to its position before the application of the external force. With this arrangement, the display panel automatically returns to the original position, thus enhancing usability.

When an external force in the pulling direction is applied to the display panel in the upright position, the controlling section may cause the display panel to move to the horizontal position. With this arrangement, a sensor can be used to stop the movement of the display panel at the horizontal position, which can reduce component count and can reduce the cost.

After the display panel is moved to the horizontal position by the controlling section, the driving section may return the display panel to its position before the application of the external force. With this arrangement, the display panel automatically returns to the original position, thus enhancing usability.

The controlling section may cause the detecting section to measure a change a movement speed of the display panel in accordance with the speed of the external force. With this arrangement, it is possible to change the driving speed of the gear transmission mechanism in accordance with the speed of an external force, to further reduce gear wear, and to extend the life of the gear transmission mechanism. Moreover, it is possible to further reduce the slip operation of the slipping section, reduce wear of components constituting the slipping of the slipping section, and maintain a high torque for a long period of time.

The monitor apparatus may fiber include a warning section for issuing a warning when the detecting section detects that an external force is applied to the display panel. With this arrangement, it is possible to draw attention by means of the warning and to reduce the occurrence of unwanted pulling or pushing down of the display panel.

When the detecting section detects that an external force is applied to the display panel, the warning section may produce an alarm sound as the warning. With this arrangement, it is possible to reliably draw attention by means of the alarm sound and to reduce the occurrence of unwanted pulling or pushing down of the display panel.

When the detecting section detects that an external force is applied to the display panel, the warning section may produce the alarm sound until a preset time is reached. With this arrangement, the time of the alarm sound can be arbitrarily set.

When the detecting section detects that an external force is applied to the display panel, the warning section may produce the alarm sound while the controlling section performs an operation for tilting the display panel. With this arrangement, the period of producing the alarm sound can be made equal to the period of operation of the controlling section, so that the period of operation of the controlling section can be made clear.

The monitor apparatus of the present invention has the controlling section for causing the detecting section to detect that an external force is applied to the display panel while it is in the upright position and for causing the driving section to drive the display panel in the direction in which the external force is applied. Thus, when an external force is applied inadvertently or intentionally, the controlling section causes the driving section to control the movement of the display panel in the direction in which the external force is applied. This arrangement can reduce damage and wear of the driving section and thus can provide a long-life monitor apparatus.

DESCRIPTION OF THE PREFERRED EMBODIMENT

Figure 1:
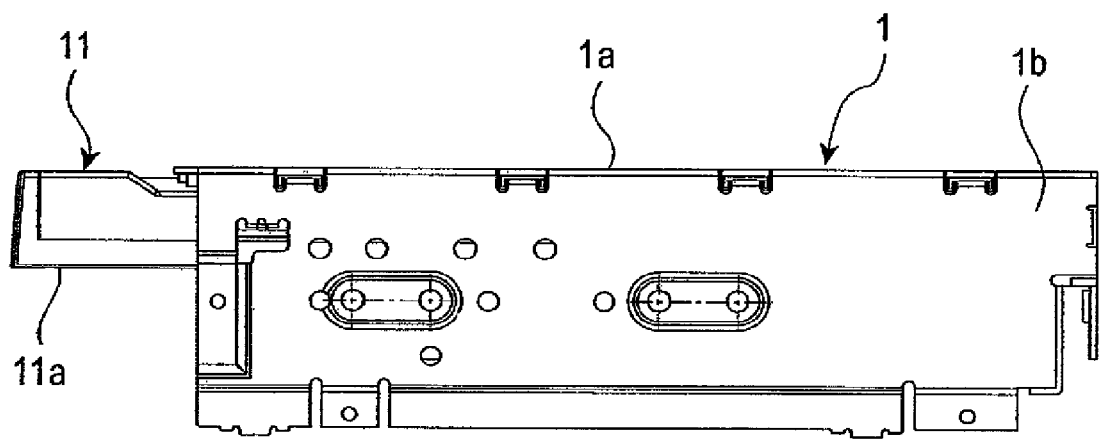
FIG. 1 is a side view showing a state in which a display panel of a monitor apparatus according to the present invention is in a housed position.
Figure 2:
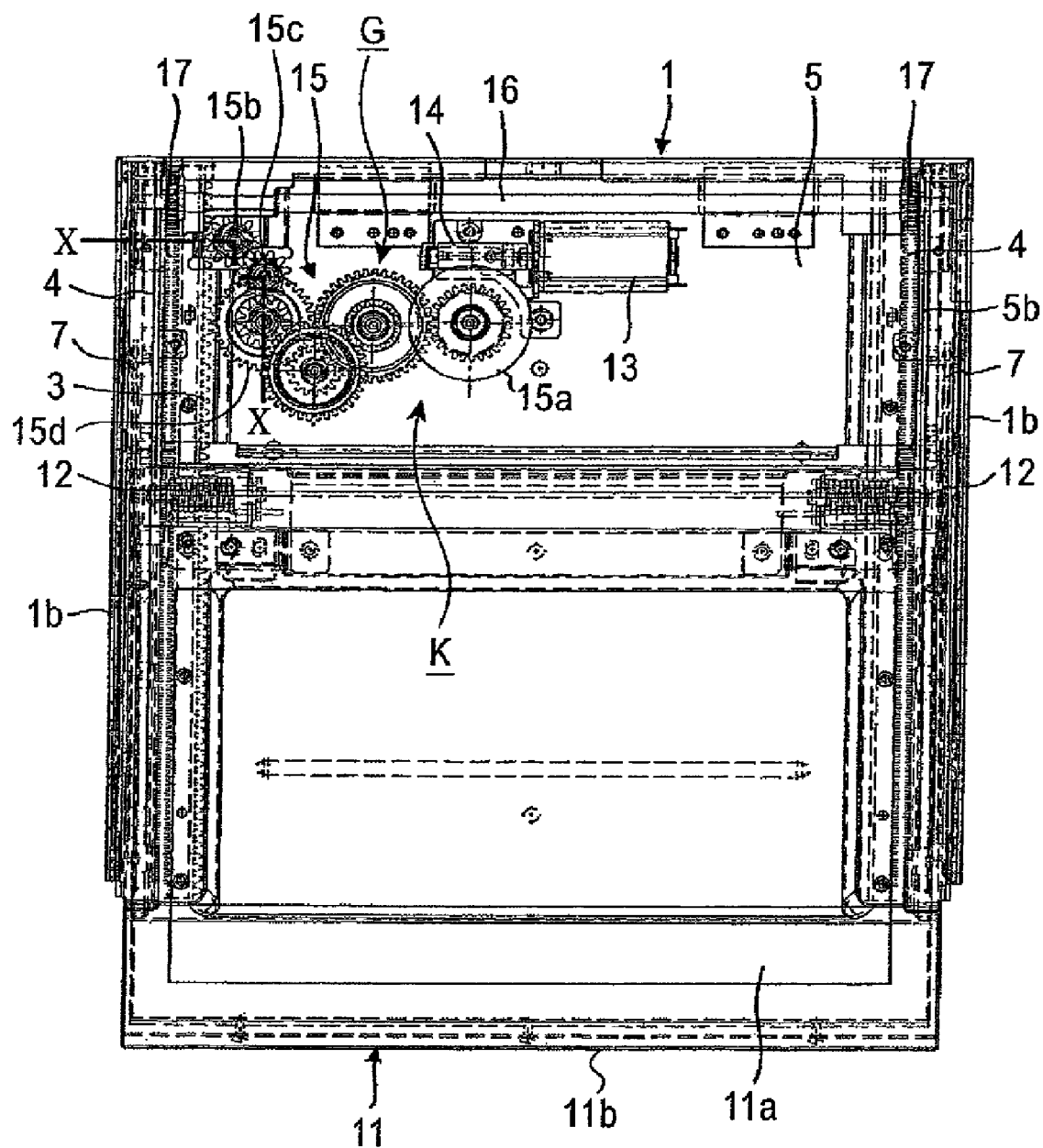
FIG. 2 is a bottom view showing a state in which the display panel of the monitor apparatus according to the present invention is in the housed position.
Figure 3:
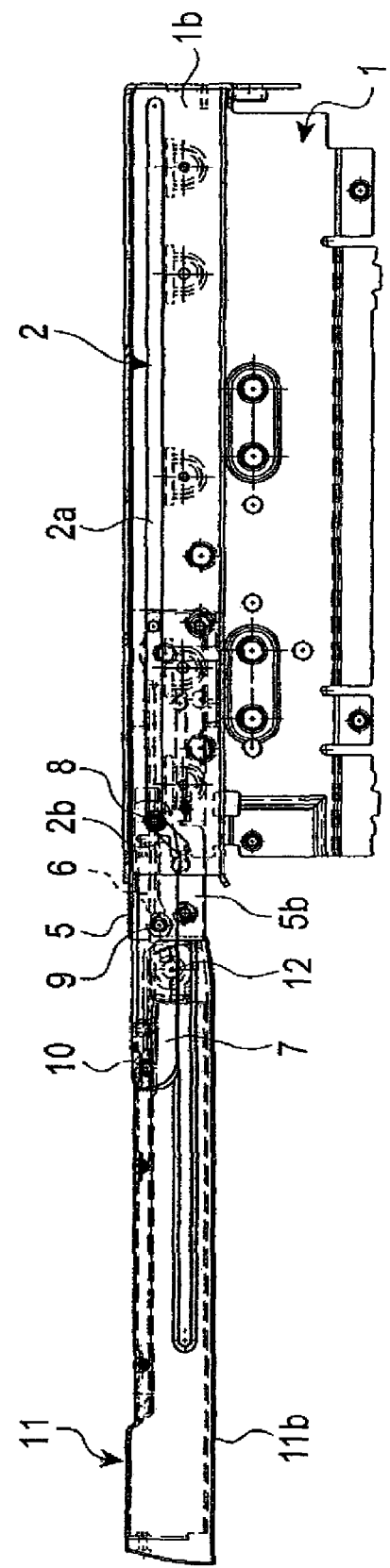
FIG. 3 is a side view showing a state in which the display panel of the monitor apparatus according to the present invention is in a horizontal position.
Figure 4:
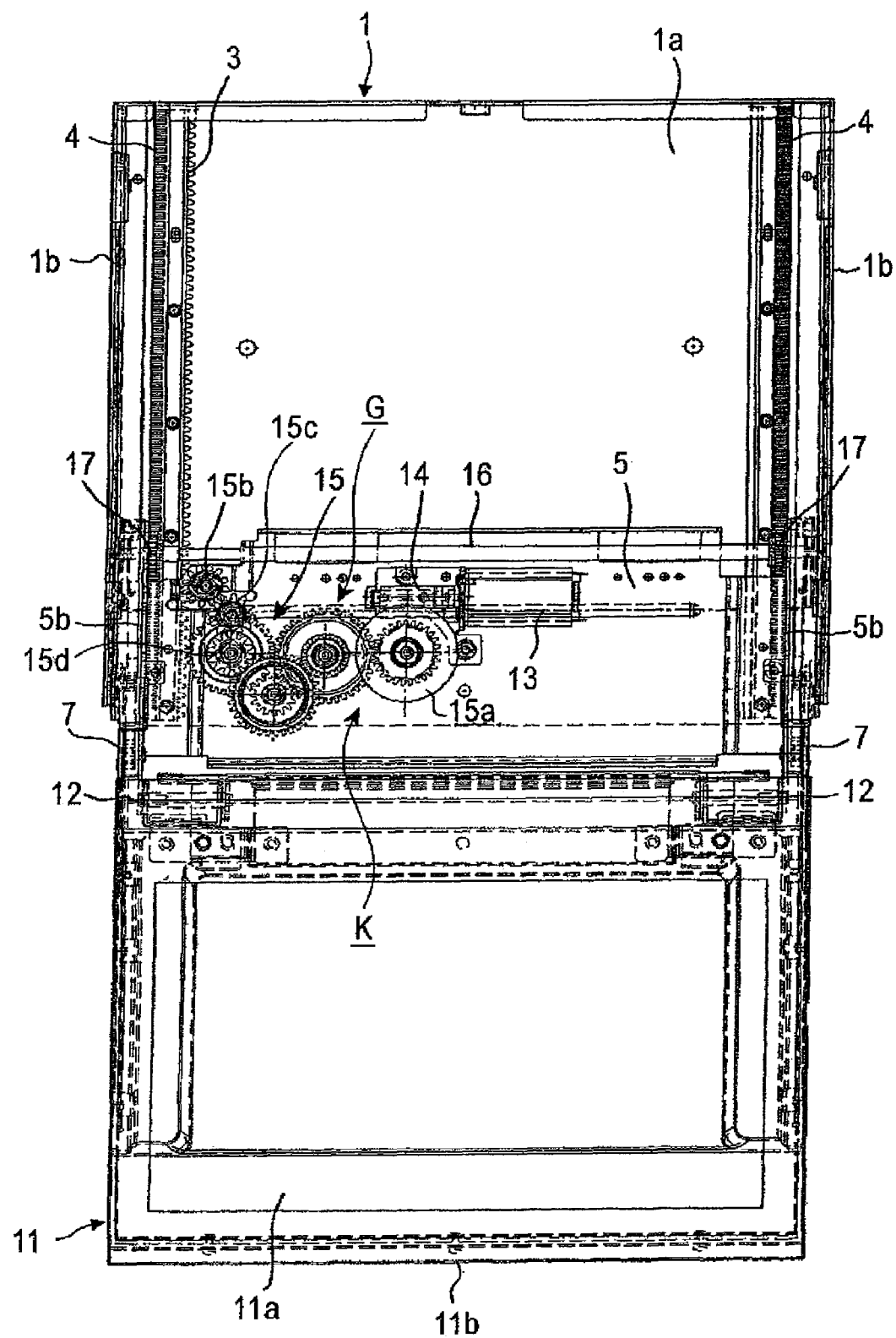
FIG. 4 is a bottom view showing a state in which the display panel of the monitor apparatus according to the present invention is in the horizontal position.
Figure 5:
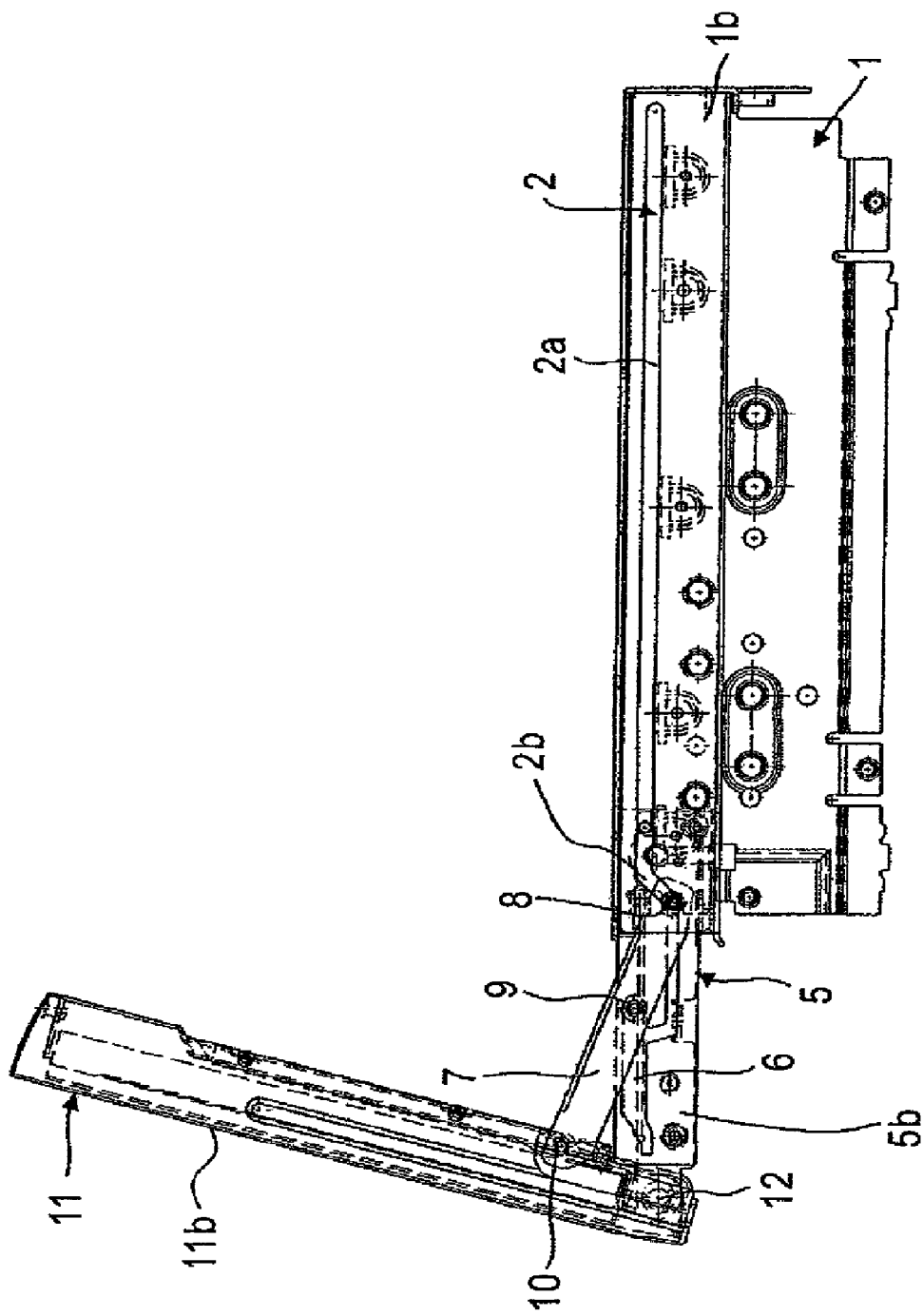
FIG. 5 is a side view showing a state in which the display panel of the monitor apparatus according to the present invention is in an upright position.

The configuration and the operation of a monitor apparatus according to one embodiment of the present invention will now be described with reference to FIGS. 1 to 7. The monitor apparatus of the present invention generally includes a housing 1, a slide body 5 movably attached to the housing 1, a drive source 13 attached to the slide body 5, a gear transmission mechanism G meshed with the drive source 13, a clutching section (clutching means) 32 (FIG. 10) provided for one of the gear transmission mechanism G, a detecting section (detecting means) 21 (FIG. 11) provided for one gear of the gear transmission mechanism G, a display panel 11 pivotably attached to the slide body 5, and a driving section (driving means) K for driving the display panel 11.

The housing 1 is accommodated in the dashboard of a vehicle and the front side (the left-hand side in FIG. 1) of the housing 1 is open. The housing 1 includes an upper flat plate 1a, a pair of opposing side plates 1b that are bent downward from two opposite sides of the upper plate 1a, and first cam portions 2 provided so as to oppose the respective side plates 1b.

Figure 7:
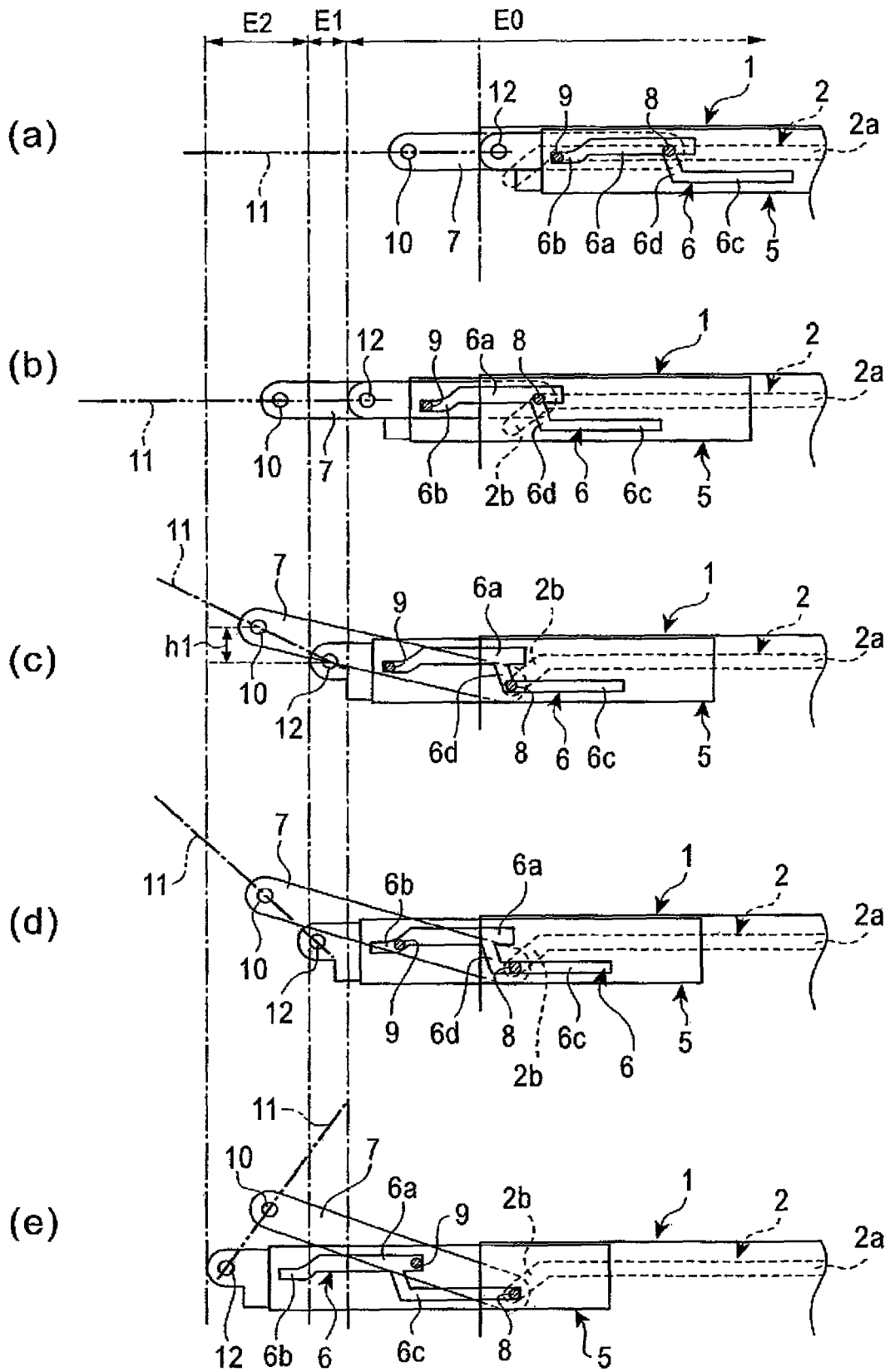
FIG. 7 is a side view illustrating a cam mechanism for moving the display panel and how the arm members and the display panel of the monitor apparatus according to the present invention are operated during the advancement and retraction of the slide body.

As indicated by a broken line shown in FIG. 7, each first cam portion 2 has a straight groove portion 2a that extends from the back side (the right-hand side in FIG. 1) of the housing 1 toward the front side thereof and an oblique groove portion 2b that is connected to the front side of the straight groove portion 2a and extends obliquely downward. The inner surface of the upper plate 1a, of the housing 1 is provided with a first rack 3 and a pair of second racks 4. The first rack 3 is spaced apart from the corresponding side plate 1b and has teeth directed inward of the housing 1. The second racks 4 are spaced apart from the side plates 1b so as to be parallel with each other and have teeth directed downward.

The slide body 5 is constituted with a chassis that is housed in the housing 1 and that is capable of advancing and retracting (i.e., moving forward and backward) and has a flat bottom plate (not shown), a pair of opposing side plates 5b, and second cam portions 6. The side plates 5b are bent from two opposite sides of the flat bottom plate of the slide body 5, and as indicated by a solid line in FIG. 7, the second cam portions 6 are provided so as to oppose the respective side plates 5b.

As indicated by a solid line shown in FIG. 7, each second cam portion 6 has a straight groove portion 6a, a first oblique groove portion 6b, a second straight groove portion 6c, and a second oblique groove portion 6d. The first straight groove portion 6a is located at an upper portion, the first oblique groove portion 6b is connected with the front side of the first straight groove portion 6a and extends obliquely downward, the second straight groove portion 6c is located at a lower portion so as to be parallel with the first straight groove portion 6a and extends rearward (i.e., backward), and the second oblique groove portion 6d is connected between the front-side portion of the second straight groove portion 6c and the first straight groove portion 6a and extends obliquely. The slide body 5 having such a structure is disposed in the housing 1, with the side plates 5b being spaced apart from the side plates 1b in an opposing manner.

Figure 6:
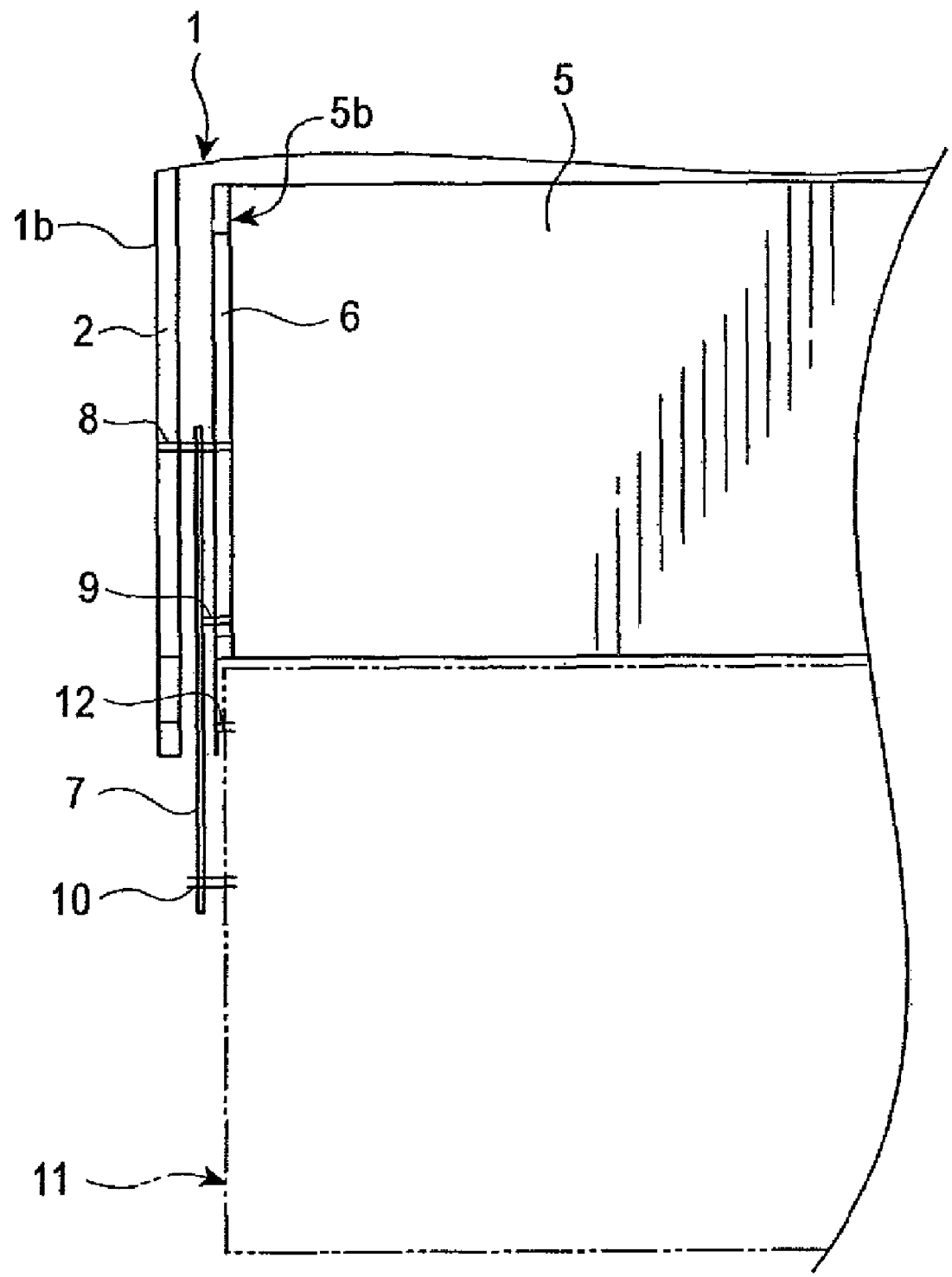
FIG. 6 is a bottom view schematically illustrating the engagement relationships of arm members, a housing, a slide body, and the display panel of the monitor apparatus according to the present invention.

In particular, as shown in FIGS. 6 and 7, two arm members 7 that are capable of performing advancing and retracting operations and a pivoting operation are disposed between the side plates 1b and the corresponding side plates 5b. Each arm member 7 is provided with a rear roller pin 8, a front roller pin 9, and a pin 10. The rear roller pin 8 is located at a rear side and is engaged with the first and second cam portions 2 and 6, the front roller pin 9 is located at a front side and is engaged with the second cam portion 6, and the pin 10 is located further forward than the front roller pin 9.

The display panel 11 has a display portion 11a, which has a liquid A lower end portion (when the display panel 11 is in its upright position) of the display panel 11 is pivotably attached to the front end portion of the slide body 5 by a pair of pivot supporting pins 12, and the pins 10 are engaged with the display panel 11 slightly above the pivot supporting pins 12 so as to allow pivoting of the display panel 11.

As described below, the display panel 11 can assume a housed position in which the display panel 11 is housed in the housing 1, a horizontal position in which the display panel 11 projects from the housed position toward the front-side of the housing 1, and an upright position in which the display panel 11 is raised from the horizontal position. The display panel 11 in the upright position can be returned to the housed position, after being lowered and returned to the horizontal position.

The drive source 13 may be configured with a motor or the like attached to the slide body 5 so as to move together with the slide body 5. The drive source 13 has a shaft to which a worm gear 14 is rotatably attached.

A rotation gear train 15 is constituted by multiple spur gears, including gears 15a and 15b, for reducing the rotation speed and is attached to the slide body 5 so as to move together with the slide body 5. The gear 15a located at one end of the rotation gear train 15 meshes with the worm gear 14. The gear 15b located at another end meshes with the first rack 3 and has a detecting section 21, which is described below. The gear 15b further meshes with a gear 15c, which is provided with a clutching means 32 described below.

The first rack 3, the worm gear 14, and the rotation gear train 15 constitute the gear transmission mechanism G. in the gear transmission mechanism G, the drive source 13 rotates in one direction (in a positive direction) to cause the worm gear 14 to rotate, which rotation is transmitted to the rotation gear train 15. This causes the rotation gear train 15 to advance (move forward) while meshing with the first rack 3, which is fixed, so that the slide body 5 also advances (moves forward) together with the arm members 7.

When the drive source 13 rotates in another direction (in a reverse direction), the worm gear 14 causes the rotation gear train 15 to rotate in a direction opposite to the case described above, so that the rotation gear tram 15 retracts (moves backward). Consequently, the slide body 5 also retracts (moves backward) together with the arm members 7.

One shaft 16 is attached to the slide body 5 in a direction that traverses the slide body 5. Gears 17 are attached to two opposite ends of the shaft 16 and mesh with the second racks 4, respectively. The gears 17 are adapted so that, when the shaft 16 moves in conjunction with the movement of the slide body 5, they rotate while meshing with the second racks 4, which are fixed. The shaft 16 and the gears 17 are adapted to allow the slide body 5 to stably advance and retract while maintaining its posture.

The driving means K includes the first cam portions 2, the slide body 5, the drive source 13, the gear transmission mechanism G, the arm members 7, and the pins 10 in the housing 1 to drive the display panel 11.

The operation of the monitor apparatus according to one embodiment of the present invention will now be described with reference to FIG. 7. E0, E1, and E2 shown in FIG. 7 indicate the movement ranges of the front end portion of the slide body 5. First, when the display panel 11 is in the housed position (see FIGS. 1 and 2) as shown in part (a) of FIG. 7, the front roller pin 9 is engaged with the front end of the first oblique groove portion 6b of the second cam portion 6, one end of the rear roller pin 8 is located in the first straight groove portion 6a above the second oblique groove portion 6d of the second cam portion 6, and another end of the rear roller pin 8 is located in the straight groove portion 2a of the first cam portion 2.

In the state shown in part (a) of FIG. 7, when the drive source 13 rotates in one direction (in the positive direction), the gear transmission mechanism G, which is constituted by the first rack 3, the worm gear 14, and the rotation gear train 15, causes the slide body 5 to advance to a position (just before E1) shown in part (b) of FIG. 7. During the movement of the slide body 5, the display panel 11 placed in a horizontal state in conjunction with the slide body 5 (i.e., is parallel thereto) travels straight (i.e., advances) together with the slide body 5, since the display panel 11 is coupled with the slide body 5 by the pivot supporting pins 12. Consequently, the display panel 11 is put into the horizontal position (see FIGS. 3 and 4) in which it protrudes from the front side of the housing 1.

Each arm member 7, which is coupled to the display panel 11 by the pin 10 and is placed in the horizontal state in conjunction with the slide body 5 and the display panel 11 (i.e., is placed in parallel thereto), travels straight (i.e., advances) following the display panel 11. In addition, the front roller pin 9 and the rear roller pin 8, which are attached to each arm member 7, move without changing a positional relationship relative to the second cam portion 6. Also, the rear roller pin 8, which is engaged with the fixed-side first cam portion 2, varies in position relative to the first cam portion 2 and thus comes to a position between the straight groove portion 2a and the oblique groove portion 2b, as shown in part (b) of FIG. 7.

Next, in the state (shown in part (3) of FIG. 7) in which the front end portion of the slide body 5 is located before E1, when the gear transmission mechanism G continues the movement of the slide body 5 to a position before E2 shown in part (c) of FIG. 7, each rear roller pin 8 moves along the oblique groove portion 2b of the first cam portion 2 (i.e., moves downward) and is engaged with an end portion of the oblique groove portion 2b to thereby stop the forward movement, as shown in part (c) of FIG. 7. Thus, the rear roller pin 8 then moves into the second oblique groove portion 6d of the second cam portion 6, so that the arm member 7 performs a pivot operation using the front roller pin 9 as its supporting point.

As a result, the arm member 7 begins to pivot upward (by a height h1) using the pivot supporting pin 12 as its supporting point. Thus, the display panel 11, which is coupled with the arm member 7 by the pin 10, also begins to pivot (rise) upward using the pivot supporting pin 12 as the supporting point.

Next, in the state (shown in part (c) of FIG. 7) in which the front end portion of the slide body 5 is located before E2, when the gear transmission mechanism G continues the movement of the slide body 5 to a position in the range of E2 shown in part (d) of FIG. 7 the slide body 5 and the second cam portion 6 advance while the forward movement of the rear roller pin 8 is being blocked by the oblique groove portion 2b, as shown in part (d) of FIG. 7. Thus, the rear roller pin 8 moves in the second straight groove portion 6c and the front roller pin 9 moves along the inclination of the first oblique groove portion 6b, so that the arm member 7 and the display panel 11 further rise.

Next, when the slide body 5 in the state shown in part (d) of FIG. 7 is brought to its end position (indicated by E2 shown in part (e) of FIG. 7) by the gear transmission mechanism G, a sensor S1 described below causes the rotation of the drive source 13 to stop, so that the movement of the slide body 5 stops. During the movement of the slide body 5 from the position shown in part (d) of FIG. 7 to the position shown in part (e) of FIG. 7, the rear roller pin 8 abuts against one end (i.e., the rear end) of the second straight groove portion 6b and the front roller pin 9 moves from the first oblique groove portion 6b to the first straight groove portion 6a to abut against one end (i.e., the rear end) of the first straight groove portion 6a, as shown in part (e) of FIG. 7.

Then, while each rear roller pin 8 is being engaged with the oblique groove portion 2b and the forward movement of the arm member 7 is being blocked, the pivot supporting pins 12 moves and projects fiber forward than the pin 10. Moreover, since the distance between the pin 10 and the pivot supporting pin 12 coupled with the display panel 11 is constant, the pivot supporting pin 12 side of the display panel 11, the pivot supporting pin 12 side being located below the pin 10 side thereof, is drawn out (i.e., moved forward) relative to the pin 10 side. Consequently, the display panel 11 is raised to its maximum-tilt upright position (see FIG. 5).

A description will now be given of a case in which the display panel 11 placed in the upright position is to be housed in the housing 1. That is, the drive source 13 is rotated in another direction (in the reverse direction), and the gear transmission mechanism G causes the slide body 5 to retract. Thus, contrary to the case described above, the operations shown in parts (e) to (a) of FIG. 7 are performed in that order, so that the display panel 11 moves from the upright position to the housed position shown in part (a) of FIG. 7 via the horizontal position shown in part (b) of FIG. 7. When the display panel 11 is placed in the housed position, the rotation of the drive source 13 is stopped through the operation of a sensor (not shown), so that the movement of the slide body 5 is stopped.

The monitor apparatus of the present invention may be used in a vehicle. One example of such a use will now be described with reference to FIGS. 8 and 9. A press-button-type operation portion 18 is provided at an upper portion of the display portion 11a of the display panel 11 in the upright position. Operation of the operation portion 18 causes a first operation in which the display panel 11 is drawn out from the housed position to the upright position and a second operation in which the display panel 11 is moved from the upright position into the housed position.

Press-button-tape operation portions 19a and 19b are provided at the upper portion of the frame 11a of the display panel 11 placed in the upright position. Operation of the operation portion 19a causes the display panel 11 to move in a direction indicated by arrow A1 by using the pivot supporting pins 12 as the supporting points. Operation of the operation portion 19b causes the display panel 11 to move in a direction indicated by arrow A2 by using the pivot supporting pins 12 as the supporting points.

The aforementioned sensor S1 is constituted by a push switch a or the like and is attached to the housing 1; a sensor S2 is constituted by a push switch or the like and is attached to the slide body 5; and a sensor S3 is constituted by a variable resistor or the like and is attached to the vicinity of the pivot supporting pins 12 in the display panel 11.

When the display panel 11 is moved to its maximum tilt position, the sensor S1 abuts against the rear surface of the frame 11b and is thus operated to stop the rotation of the drive source 13. When the display panel 11 moves to the horizontal position, the sensor S2 abuts against the bottom surface of the frame 11b and is thus operated to confirm that the display panel 11 is in the horizontal position. Further, when the operation portion 19a or 19b is operated, the sensor S3 is used to detect the rotation of the display panel 11 in the direction indicated by either arrow A1 or arrow A2.

Figure 8:
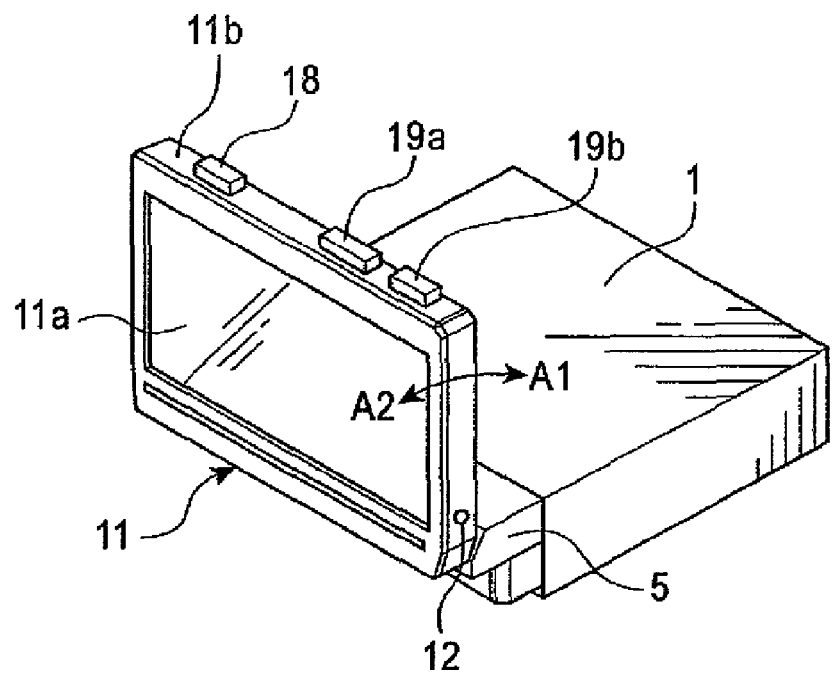
FIG. 8 is a perspective view showing a state in which the display panel of the monitor apparatus according to the present invention is in the upright position.

The general operation of the monitor apparatus of the present invention will now be described with reference to FIGS. 8 and 9. First, when the operation portion 18 is pushed while the display panel 11 is in the housed position, the drive source 13 is rotated in, for example, the positive direction.

Figure 9:
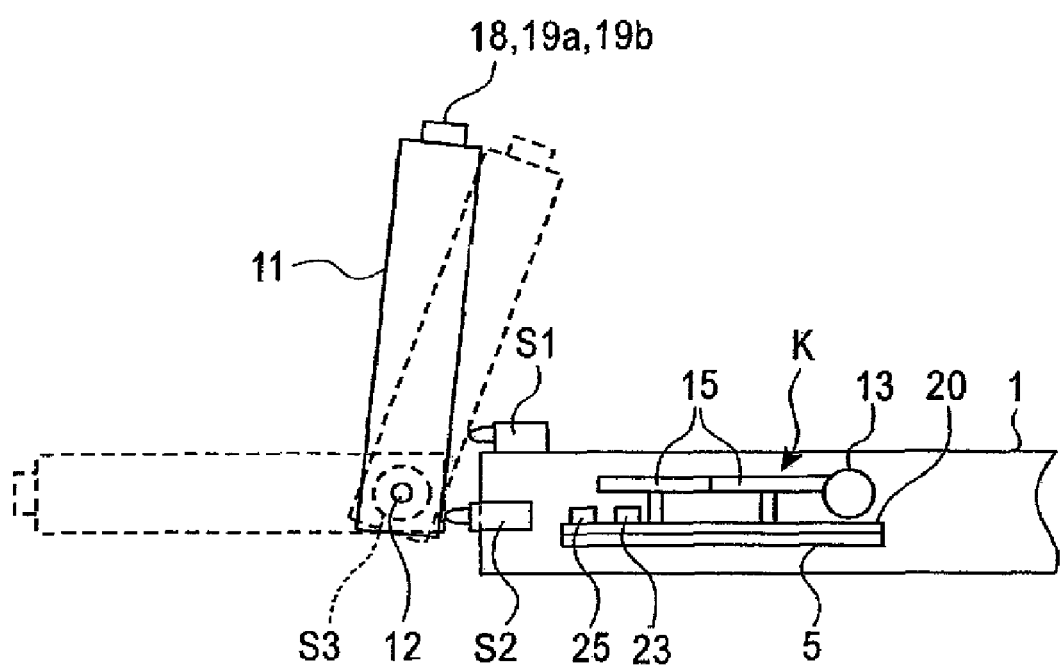
FIG. 9 is a side view schematically illustrating the operation of the display panel of the monitor apparatus according to the present invention.

In response, the driving means K, which includes the gear transmission mechanism G, causes the display panel 11 to move from the housed position to the maximum tilt position indicated by a dotted line in FIG. 9 via the horizontal position. In the maximum tilt position, the sensor S1 is operated by the rear surface of the display panel 11, so that the rotation of the drive source 13 is stopped and the movement of the display panel 11 is stopped.

When the operation portion 19b is pushed in order to adjust the angle of the display panel 11 to an easy-to-view angle and this state is maintained, the drive source 13 is rotated in, for example, the reverse direction and the driving means K causes the display panel 11 to rotate in the arrow A2 direction by using the pivot supporting pins 12 as the supporting points.

At this point, the display panel 11 can be rotated while the tilt angle thereof is stored by storing means via the sensor S3. When the display panel 11 is rotated too much, releasing the depressed operation portion 19b, pressing the operation portion 19a, and maintaining this state causes the drive source 13 to rotate in, for example, the positive direction. In response, the driving means K causes the display panel 11 to rotate in the arrow A1 direction by using the pivot supporting pins 12 as the supporting points.

When the display panel 11 is rotated to a desired position indicated by the solid line shown in FIG. 9, the position of the display panel 11 is stored by the storing means. Subsequently, when the display panel 11 is drawn out from the housed position, it is automatically set to the stored position. Typically, the desired position of the-display panel 11 is located before the maximum tilt position.

Next, when it is desired to house the display panel 11, pressing the operation portion 18 causes the drive source 13 to rotate in the reverse direction, so that the driving means K, which includes the gear transmission mechanism G, causes the display panel 11 to pivot from the upright position to approximately the horizontal position indicated by a dotted line shown in FIG. 9.

When the display panel 11 moves to the horizontal position indicated by the dotted line shown in FIG. 9, the sensor S2 is operated by the bottom surface of the display panel 11 to confirm that the display panel 11 is in the horizontal position, Thereafter, the display panel 11 is retracted by the driving means K to the housed position, so that the rotation of the drive source 13 is stopped.

Although the monitor apparatus of the above-described embodiment of the present invention is configured so that the drive source 13 including one motor is used to eject and retract the display panel 11 (for the housed position, the horizontal position, and the upright position), the present invention is not limited thereto. For example, two drive sources including two motors may be used so that a first one of them is used to eject and retract the slide body to discharge and house the display panel 11 and the second one is used to raise and lower the display panel 11.

One example of the structure of the aforementioned clutching means 32 built in the monitor apparatus of the present invention will now be described with reference to FIG. 10 The gear 15c of the rotation gear train 15 has first and second gears 30 and 31. The clutching means 32 is provided between the first gear 30 and the second gear 31.

The clutching means 32 includes a bed plate 33, multiple spring members 34, multiple balls 35, and a stopper 36, which constitute a clutch-equipped gear. The bed plate 33 is inserted over a shaft portion 30a of the first gear 30 located at a lower side, the spring members 34 are inserted through the shaft portion 30a and are located in a hollow portion 31a of the second gear 31 located at an upper side, and the balls 35 are placed on the spring members 34 in the hollow portion 31a. The stopper 36 is attached to the shaft portion 30a to retain the spring members 34 and the balls 35 while pressing them against the bed plate 33.

When a load having a predetermined rotational torque or more is applied from the gear 15b or a gear 15d, the clutching means 32 is adapted to cause a slip between the first gear 30 and the second gear 31.

With such a clutch-equipped gear used for the rotation gear train 15, when an external force is applied to the display panel 11 placed in the upright position and a load having the predetermined rotational torque or more is applied to the first gear 30 via the gear 15b, the clutch-equipped gear loses traction, thereby preventing loss of gear teeth.

The clutching means 32 may have a structure other than the one described above. For example, such a clutched-equipped gear may be attached to an arbitrary gear of the rotation gear train 15 or may be eliminated from the rotation gear train 15.

The configuration and the operation of one example of the aforementioned detecting section 21 built in the monitor apparatus of the present invention will now be described with reference to FIGS. 10 to 12. The detecting section 21 is attached to the gear 15b of the rotation gear train 15 with an adhesive or the like and is constituted by a reflective sheet 22 and a photo-interrupter 23. The reflective sheet 22 has three white sections with different widths and three black sections with different widths. The photo-interrupter 23 is disposed on a printed circuit board 20 to emit light to the reflective sheet 22.

Figure 10:
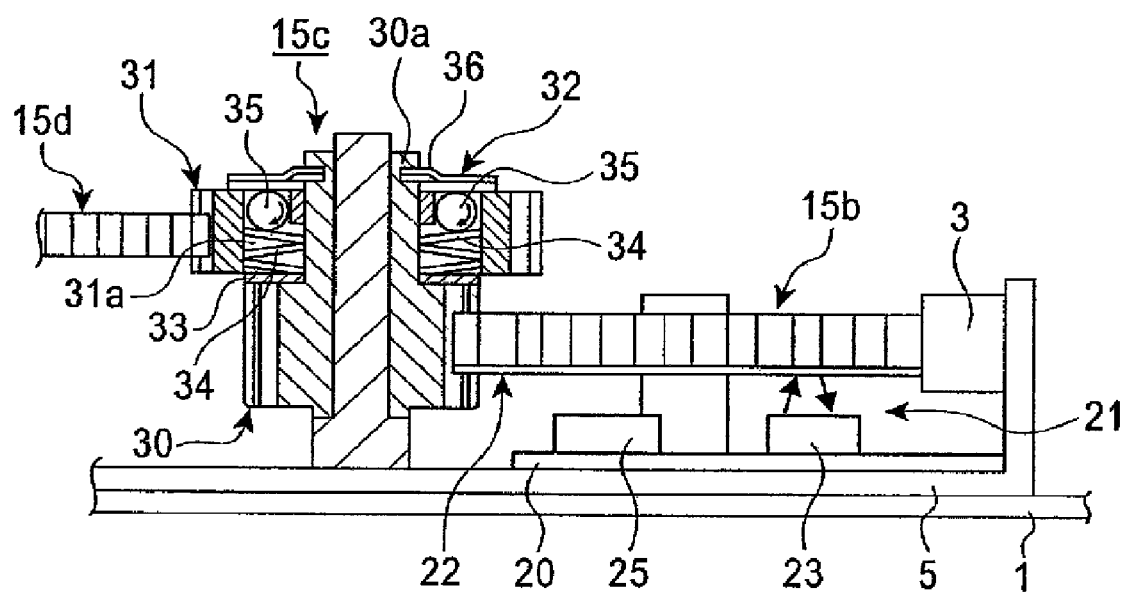
FIG. 10 is a sectional view taken along line X-X shown in FIG. 2.
Figure 11:
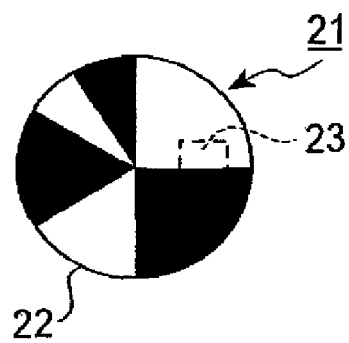
FIG. 11 is a schematic view illustrating the operation of a detecting section of the monitor apparatus according to the present invention.
Figure 12:
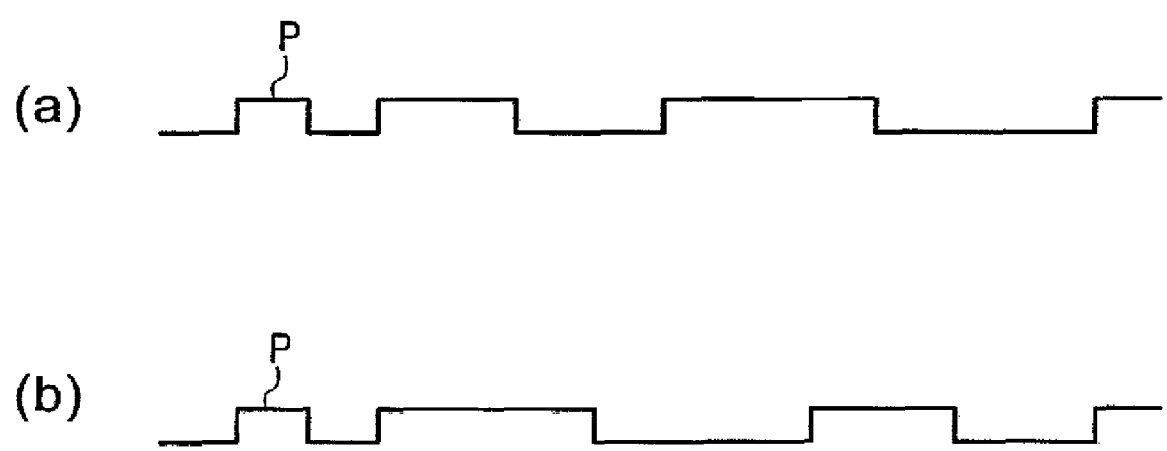
FIG. 12 has diagrams showing waveforms of pulses produced from the detecting section of the monitor apparatus according to the present invention.

As shown in FIG. 10, when the gear 15b is rotated to cause the reflective sheet 22 to rotate relative to the photo-interrupter 23, which is fixed, the photo-interrupter 23 of the detecting section 21 obtains pulses as shown in FIG. 12 which result from light reflected from the white and black sections of the reflective sheet 22.

For example, when the gear 15b is rotated rightward (i.e., clockwise), a reference high pulse P having its minimum pulse width is followed by a high pulse having the second smallest width, as indicated by waveform (a) shown in FIG. 12, thereby making it possible to determine the rightward (i.e., clockwise) rotation of the gear 15b. Conversely, when the gear 15b is rotated leftward (i.e., counterclockwise), the reference pulse P having the minimum pulse width is followed by a high pulse having the largest width, as indicated by waveform (b) shown in FIG. 12, thereby making it possible to determine the leftward (i.e., counterclockwise) rotation of the gear 15b.

As shown in FIG. 10, the printed circuit board 20 has semiconductor IC components 25 including various circuits, such as a control circuit 24 (see FIG. 17) for processing signals from the detecting section 21.

The detecting section 21 is attached to one gear of the rotation gear train 15 in the embodiment described above. When the display panel 11 of the monitor apparatus is in the upright position, it is susceptible to an external force, such as force due to a passenger's inadvertent contact, or a force intentionally induced by push down or pull down when the passenger operates an air conditioner located behind the display panel 11 or when the passenger adjusts the angle of the display panel 11 to an easy-to-view position.

In such a case, the external force is transmitted to the driving means K via the display panel 11. In response, the gear 15b, which is provided with the detecting section 21, is rotated, and the detecting section 21 detects via the rotation thereof that the external force is applied to the display panel 11. This also makes it possible to determine the direction of the external force applied to the display panel 11.

Figure 17:
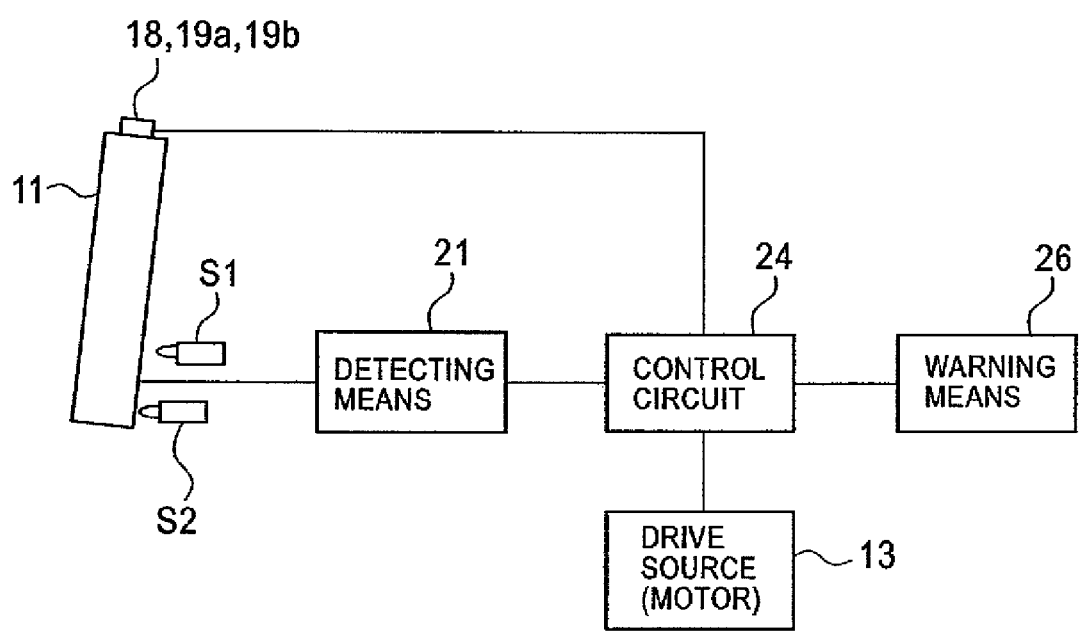
FIG. 17 is a block diagram illustrating the operation of the controlling section of the monitor apparatus according to the present invention.

FIG. 17 is a block diagram illustrating the operation of a controlling section in the monitor apparatus. An overview of the controlling section will now be described with reference to FIG. 17. First, when an external force is applied to the display panel 11, the detecting section (detecting means) 21 detects that the external force is applied to the display panel 11.

In response, a signal output from the detecting section 21 is input to a control circuit 24, which serves as the controlling section. In accordance with the output signal, a positive or reverse current is supplied to the drive source 13 via the control circuit 24 to rotate the drive source 13. Consequently, the driving means K causes the display panel 11 placed in the upright position to move (i.e., to pivot by using the pivot supporting pins 12 as the supporting points).

That is, when an external force is applied to the display panel 11 placed in the upright position, the controlling section drives the driving means K in accordance with the output signal from the detecting section 21 to thereby cause the display panel 11 to move in the direction in which the external force was applied.

Thus, when an external force is applied to the display panel 11 inadvertently or intentionally, the controlling section assists (supports) the movement in the direction in which the external force was applied to the display panel 11. With this arrangement, possible damage to the driving means K is reduced and also a load due to the external force on the gear(s) of the gear transmission mechanism G is reduced. Consequently, loss of gear teeth is eliminated and wear of the gears is reduced, so that the life of the gear transmission mechanism G is extended.

The configuration and the operation of a first example of the controlling section will now be described with reference to FIGS. 13A, 13B, 14A, and 14B. When an external force in a direction in which it pulls down the display panel 11 is applied to the display panel 11 placed in the above-described upright position, as indicated by the solid line shown in FIG. 13A, the rotation gear train 15 of the driving means K is first rotated and the detecting section 21 is operated.

In response, the control circuit 24 causes the drive source 13 to rotate the rotation gear train 15 in the direction in which the external was applied. Thus, for example, the drive source 13 rotates, for example, in the reverse direction, and under the control of the controlling section, the gear transmission mechanism G causes the display panel 11 to pivot to the horizontal position indicated by a broken line shown in FIG. 13A (the position indicated by a solid line shown in FIG. 13B).

Figure 13A:
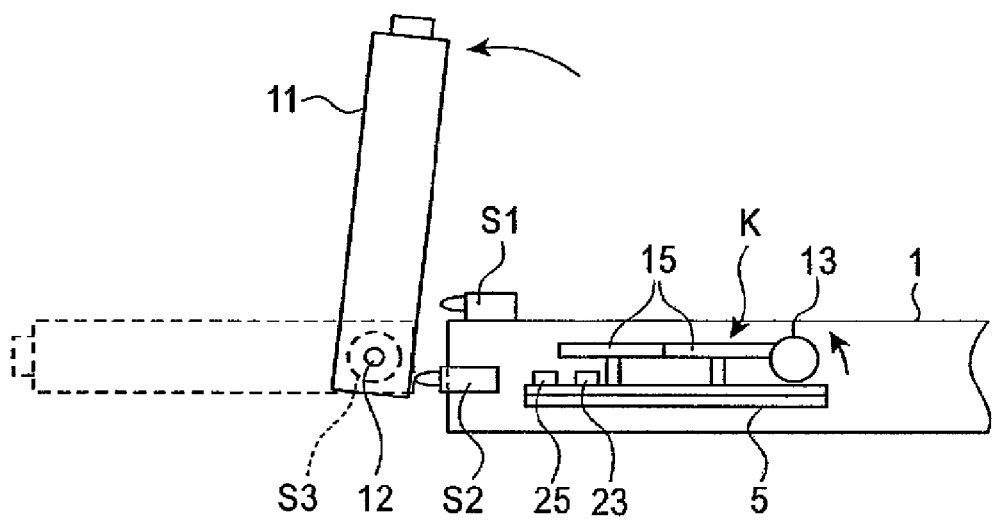
FIGS. 13A and 13B are side views schematically illustrating a first example of a controlling section of the monitor apparatus according to the present invention when an external force in a pull down direction is applied to the display panel.
Figure 13B:
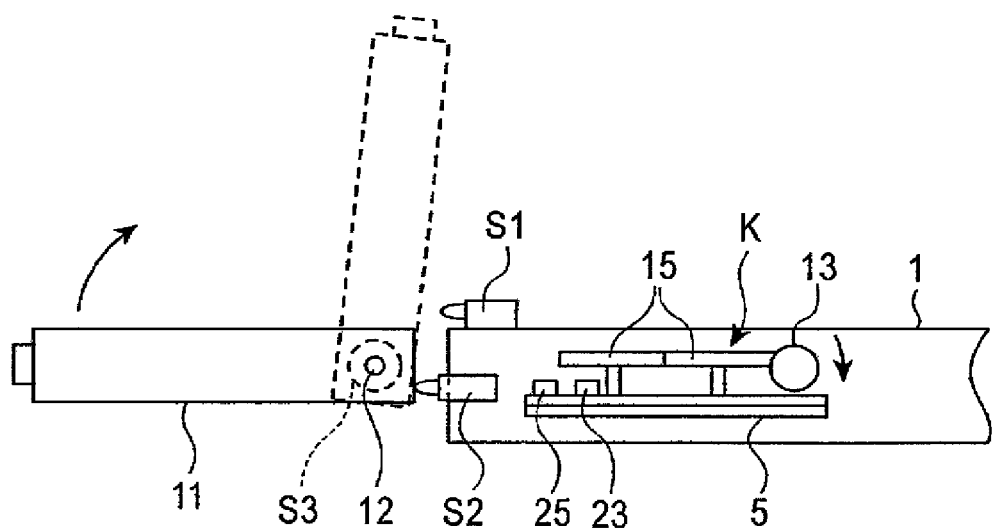

Next, when the display panel 11 is moved into the horizontal position indicated by the solid line shown in FIG. 13B, the sensor S2 is operated by the bottom surface of the display panel 11 to thereby output a signal. In response to the signal output from the sensor S2, a positive current is supplied to the drive source 13 via the control circuit 24 to cause the drive source 13 to rotate in, for example the positive direction.

In response, the rotation gear train 15 of the driving means K is rotated, so that the display panel 11 returns to the original position indicated by the dotted line in FIG. 13B (the position indicated by the solid line in FIG. 13A) and comes to a stop. The operation in which the display panel 11 returns to the original position (the position indicated by the solid line in FIG. 13A) and comes to a stop is performed by a signal sent from the sensor S3 via the storing means.

When the sensor S2 is used for returning the display panel 11, the operation portion 18 and the operation portions 19a and 19b are electrically connected to the control circuit 24, as shown in FIG. 17. Further, a determination is made as to whether or not any of the operation portion 18 and the operation portions 19a and 19b is operated. When any of the operation portion 18 and the operation portions 19a and 19b is not operated, the sensor S2 is used to return the display panel 11.

Figure 14A:
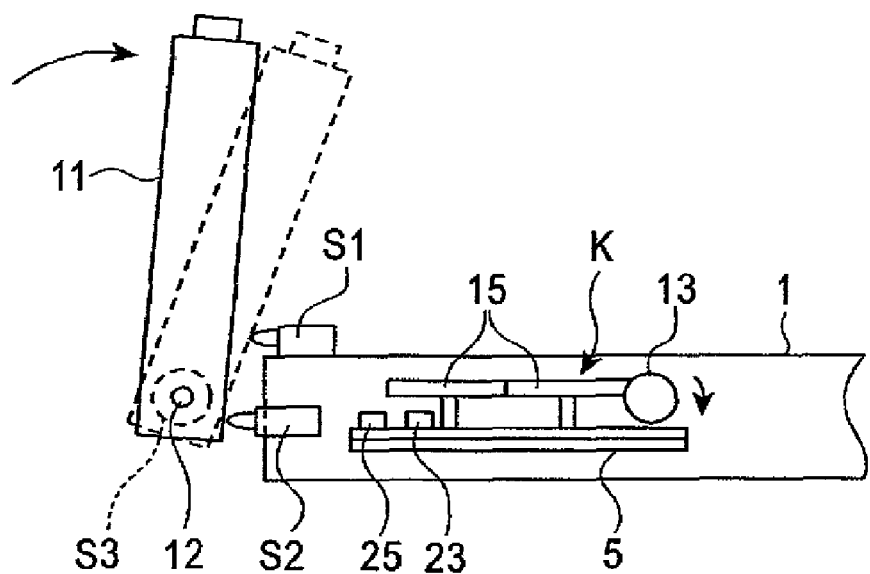
FIGS. 14A and 14B are side views schematically illustrating a first example of the controlling section of the monitor apparatus according to the present invention when an external force in a push down direction is applied to the display panel.

Next, the configuration and the operation of the first example of the controlling section when the display panel 11 is pushed down will be described with reference to FIGS. 14A and 14B. When an external force in a push down direction is applied to the display panel 11 placed in the upright position, as indicated by a solid line in FIG. 14A, the rotation gear train 15 of the driving means K is first rotated and the detecting section 21 is operated.

Then, in response to a signal sent from the control circuit 24, the drive source 13 rotates the rotation gear train 15 in the direction in which the external force was applied. Thus, the drive source 13 rotates in, for example, the positive direction, and under the control of the controlling section, the gear transmission mechanism G causes the display panel to pivot to the maximum tilt position indicated by a broken line in FIG. 14A (the position indicated by a solid line in FIG. 14B).

Figure 14B:
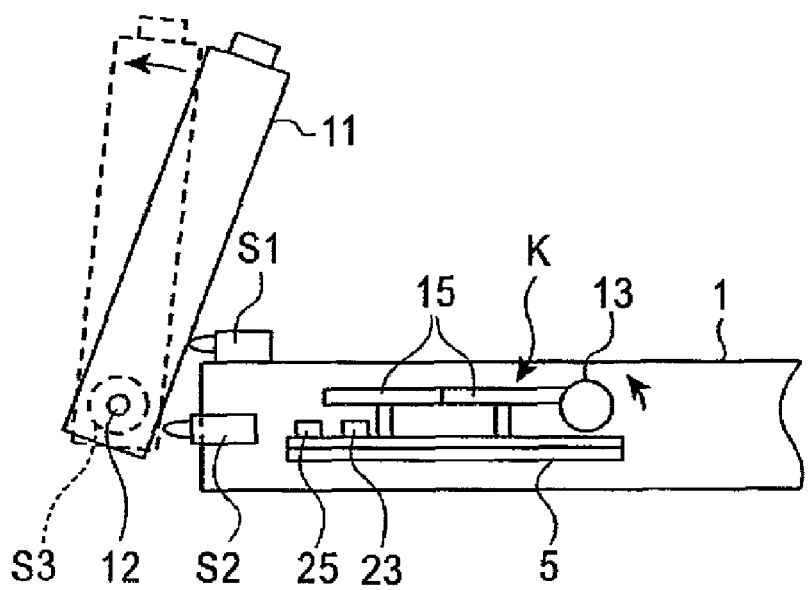

Next, when the display panel 11 is moved to the maximum tilt position indicated by a solid line in FIG. 14B, the sensor S1 is operated by the rear surface of the display panel 11 to thereby output a signal. In response to the signal output from the sensor S1, a reverse current is supplied to the drive source 13 via the control circuit 24 to cause the drive source 13 to rotate in, for example, the reverse direction.

In response, the rotation gear train 15 of the driving means K is rotated, so that the display panel 11 returns to the original position indicated by a dotted line in FIG. 14B (the position indicated by the solid line in FIG. 14A) and comes to a stop. This operation in which the display panel 11 returns to the original position (the position indicated by the solid line in FIG. 14A) and comes to a stop is performed by a signal sent from the sensor S3 via the storing means.

When the sensor S1 is used for returning the display panel 11, the operation portion 18 and the operation portions 19a and 19b are electrically connected to the control circuit 24, as shown in FIG. 17. Further, a determination is made as to whether or not any of the operation portion 18 and the operation portion 19a and 19b is operated. When the operation portion 18 and the operation portions 19a and 19b are not operated, the sensor S1 is used to return the display panel 11.

The examples described above are arrangements in which the display panel 11 is moved into the horizontal position and the maximum tilt position, but the present invention is not limited thereto. For example, the arrangement may be such that the control circuit 24 can arbitrarily set the drive time of the driving means K. With this arrangement, the controlling section may cause the display panel 11 to move for a predetermined time (e.g., 3 to 5 seconds).

The examples described above are arrangements in which the display panel 11 returns to the stored position from the horizontal position and the maximum tilt position, but the present invention is not limited thereto. For example, the arrangement may be such that, after the display panel 11 is pivoted until a time preset by the controlling section, the driving means K returns the display panel 11 to a position assumed before the application of an external force.

In addition, the arrangement may be such that the controlling section causes the display panel 11 to pivot in a predetermined range of angles. Also, the arrangement may be such that, after the display panel 11 is moved in a predetermined range of angles by the controlling section, the driving means K returns the display panel 11 to a position assumed before the application of an external force.

The configuration and the operation of a second example of the controlling section will now be described with reference to FIGS. 15A, 15B, 16A, and 166B. When an external force in the pull down direction is applied to the display panel 11 placed in the upright position, as indicated by a solid line in FIG. 15A, the rotation gear train 15 of the driving means K is first rotated and the detecting section 21 is operated.

In response to a signal sent from the control circuit 24, the drive source 13 rotates the rotation gear train 15 in the direction in which the external force was applied. Thus, the drive source 13 rotates in, for example, the reverse direction, and under the control of the controlling section, the gear transmission mechanism G causes the display panel 11 to pivot to a position indicated by a broken line in FIG. 15A (the position indicated by a solid line in FIG. 15B) until a preset time or a preset angle is reached.

Figure 15A:
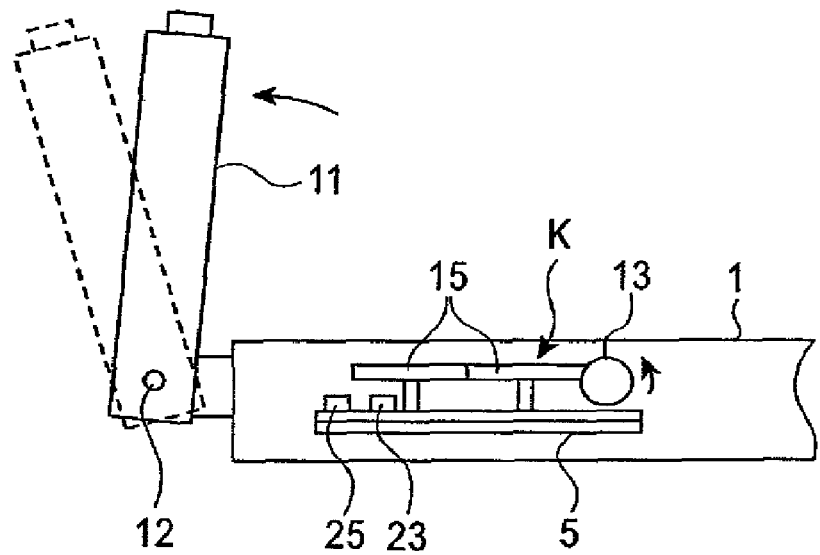
FIGS. 15A and 15B are side views schematically illustrating a second example of the controlling section of the monitor apparatus according to the present invention when an external force in the pull down direction is applied to the display panel.
Figure 15B:
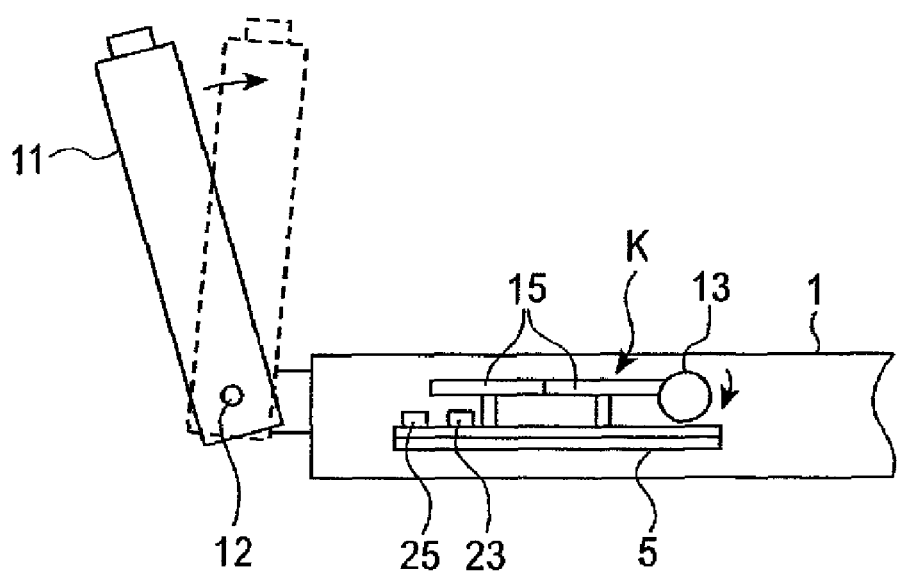

Next, when the display panel 11 is moved to the position indicated by the solid in FIG. 15B, a positive current is supplied to the drive source 13 via the control circuit 24 to cause the drive source 13 to rotate in, for example, the positive direction. In response, the rotation gear train 15 of the driving means K is rotated, so that the display panel 11 returns to the stored original position indicated by a dotted line in FIG. 15B (the solid line in FIG. 15A) and comes to a stop. The operation in which the display panel 11 returns to the stored original position (the position indicated by the solid line in FIG. 15A) and comes to a stop is performed by a signal sent from the sensor S3 via the storing means.

Figure 16A:
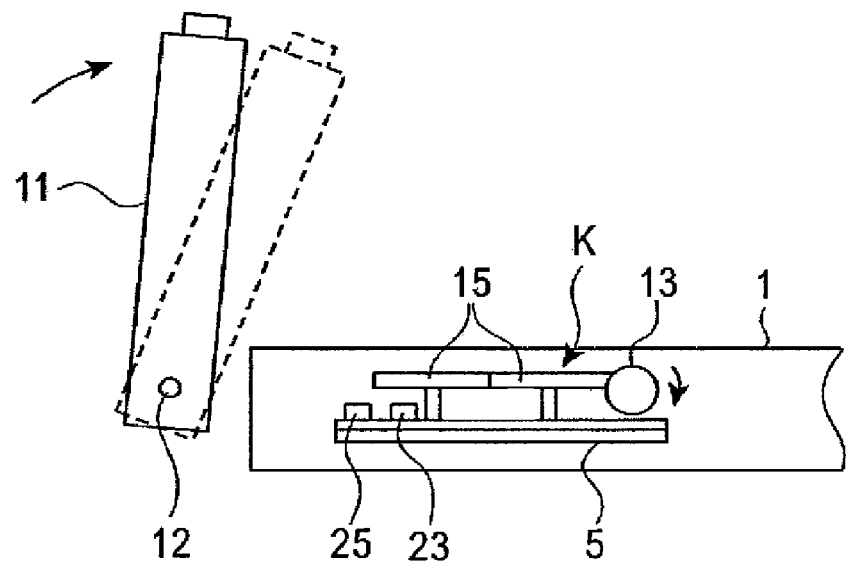
FIGS. 16A and 16B are side views schematically illustrating a second example of the controlling section of the monitor apparatus according to the present invention when an external force in the push down direction is applied to the display panel.

Next, the configuration and the operation of the second example of the controlling section when the display panel 11 is pushed down will now be described with reference to FIGS. 16A and 168. When an external force in the push down direction is applied to the display panel 11 placed in the upright position, as indicated by a solid line in FIG. 16A, the rotation gear train 15 of the driving means K is first rotated and the detecting section 21 is operated.

In response to a signal sent from the control circuit 24, the drive source 13 rotates the rotation gear train 15 in the direction in which the external force was applied. Thus, the drive source 13 rotates in, for example, the positive direction, and under the control of the controlling section, the gear transmission mechanism G causes the display panel 11 to pivot to a position indicated by a broken line in FIG. 16A (the position indicated by a solid line in FG. 16B) until a preset time or a preset angle is reached.

Figure 16B:
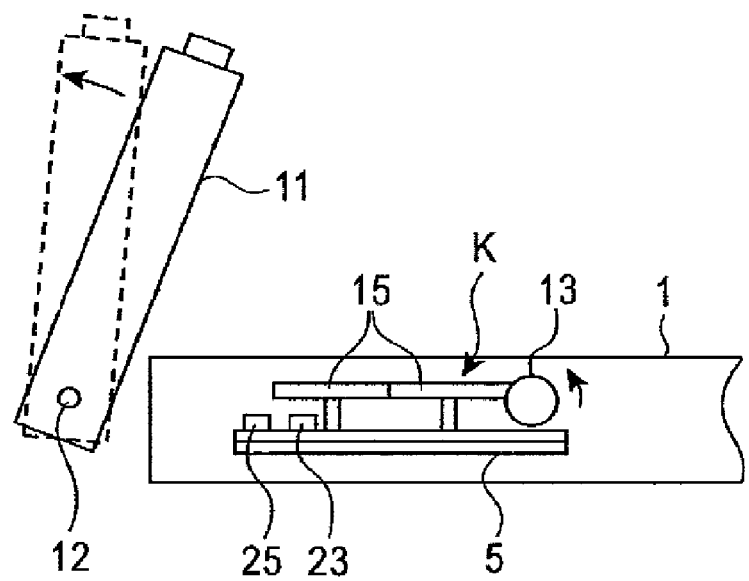

Next, when the display panel 11 is moved to the position indicated by the solid line in FIG. 16B, a reverse current is supplied to the drive source 13 via the control circuit 24 to cause the drive source 13 to rotate in the reverse direction. In response, the rotation gear train 15 of the driving means K is rotated, so that the display panel 11 returns to the stored original position indicated by a dotted line in FIG. 16B (the position indicated by the solid line in FIG. 16A) and comes to a stop. This operation in which the display panel 11 returns to the stored original position (the position indicated by the solid line in FIG. 16A) and comes to a stop is performed by a signal sent from the sensor S3 via the storing means.

The arrangement may be such that the number of pulses shown in FIG. 12 is counted and the controlling section permits the movement of the display panel 11 until a predetermined number of pulses is detected. A stepping motor may also be used for the drive source 13, in which case the arrangement may be such that a predetermined number of steps is counted (e.g., the motor is stopped at a count of 50 steps) to limit the movement range of the display panel 11.

In addition, the arrangement may be such that, when the display panel 11 is pivoted by the controlling section and then the detecting section 21 detects that no external force is applied, the display panel 11 is returned to the stored original position. The arrangement may also be such that, at a predetermined time after the display panel 11 is pivoted by the controlling section, the display panel 11 is returned to the stored original position.

It is preferred that, in the rotation gear train 15 that receives drive power from the display panel 11 to which an external force is applied, the detecting section 21 be attached to one of the gears (located closest to the display panel 11) that initially receive the power. This arrangement makes it possible to increase the speed of external-force detection and also to speed up the operation of the controlling section.

The detecting section 21 may be implemented with an optical-system device using two photo-interrupters 23 or may be implemented with a device using a rotary positioning sensor employing a variable resistance system, a contact switching system, a magnetic system, or the like. The sensor S3 may also be used as the detecting section 21 The detecting section 21 may be provided for the clutch-equipped gear. Also, the detecting section 21 may be attached to an idle gear that meshes with the gear transmission mechanism G.

The detecting section 21 may be achieved by a touch sensor provided on the front surface and/or the rear surface of the frame 11b of the display panel 11, for detecting an applied external force.

Alternatively, the detecting section 21 may be achieved by a touch panel provided on the display portion 11a of the display panel 11. In such a case, when the touch panel is not used for menu selection, the touch panel detects an applied external force.

Moreover, in addition to the function of the controlling section, the monitor apparatus of the present invention has functions for controlling the rotation of the drive source 13 in response to the speed of an external force and for issuing a warning, such as an alarm sound.

The rotation control in the monitor apparatus of the present invention will now be described. In accordance with the signal output from the detecting section 21, the control circuit 24 detects, for example, a pulse speed, and a voltage corresponding to the speed of an external force is supplied to the drive source 13 via the control circuit 24. With this arrangement, the controlling section can change the driving speed of the gear transmission mechanism G in accordance with the speed of an external force.

The warning (alarm) issued by the monitor apparatus of the present invention will now be described with reference to FIG. 17. As shown, when a signal output from the detecting section 21 is input to the control circuit 24, the signal is sent from the control circuit 24 to a warning section (warning means) 26 and an alarm sound or the like is then output from the warning section 26.

Other than a warning using an alarm sound, the display portion 11a may be used to display, for example, a visual warning such as a specific still image, or a red blinking alert. Such a warning may be issued in various forms, for example, for a preset time or while the controlling section performs the tilting operation of the display panel 11.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. A monitor apparatus comprising:
a display panel adapted to be housed in a housed position;
driving means comprising a gear transmission mechanism for driving the display panel and causing the display panel to perform a first operation in which the display panel is moved from the housed position to an upright position via a horizontal position, in which the display panel projects from the housed position, and a second operation in which the display panel is lowered from the upright position and is drawn into the housed position via the horizontal position, wherein the driving means drives the display panel to pivot to the upright position in the first operation and drives the display panel to pivot from the upright position in the second operation;
detecting means for detecting whether an external force is applied to the display panel placed in the upright position in a direction in which the driving means drives the display panel to pivot; and
a controlling section for, when the detecting means detects that such an external force is applied to the display panel placed in the upright position, causing the driving means to drive the display panel to move in the direction in which the external force is applied;
wherein the detecting means detects whether an external force is applied in directions in which the display panel is pushed down and pulled down, and wherein, when an external force in the push down direction is applied to the display panel, the detecting means detects that the external force in the push down direction is applied and the controlling section causes the driving means to drive the display panel to pivot in the push down direction, and when an external force in the pull down direction is applied to the display panel, the detecting means detects that the external force in the pull down direction is applied and the controlling section causes the driving means to drive the display panel to pivot in the pull down direction.

2. The monitor apparatus according to claim 1, wherein the gear transmission mechanism comprises a gear train including a plurality of rotatable gears, and the detecting means is associated with at least one of the gears to detect, via rotation of the at least one gear, that the external force is applied to the display panel.

3. The monitor apparatus according to claim 2, wherein the plurality of gears comprises a first gear and a second gear and comprises clutching means for causing a slip when a load having a predetermined torque or more is applied, the clutching means comprising a clutch-equipped gear provided between the first gear and the second gear; and the detecting means is associated with the clutch-equipped gear or at least one of the gears other than the clutch-equipped gear.

4. The monitor apparatus according to claim 1, wherein when the external force is applied to the display panel placed in the upright position, the controlling section causes the display panel to move until a preset time is reached.

5. The monitor apparatus according to claim 4, wherein, after the display panel is moved by the controlling section until the preset time is reached, the driving means returns the display panel to its position before the application of the external force.

6. The monitor apparatus according to claim 1, wherein, when the external force is applied to the display panel placed in the upright position, the controlling section causes the display panel to move in a preset range of angles.

7. The monitor apparatus according to claim 6, wherein, after the display panel is moved in the preset range of angles by the controlling section, the driving means returns the display panel to its position before the application of the external force.

8. The monitor apparatus according to claim 1, wherein the display panel is capable of performing an operation for rising from the horizontal position to a maximum tilt position in which a tilt angle of the display panel is maximum, and wherein, when an external force in the push down direction is applied to the display panel placed in an upright position other than the maximum tilt position, the controlling section causes the display panel to move to the maximum tilt position.

9. The monitor apparatus according to claim 8, wherein, after the display panel is moved to the maximum tilt position by the controlling section, the driving means returns the display panel to its position before the application of the external force.

10. The monitor apparatus according to claim 1, wherein, when the external force in the pull down direction is applied to the display panel placed in the upright position, the controlling section causes the display panel to move to the horizontal position.

11. The monitor apparatus according to claim 10, wherein, after the display panel is moved to the horizontal position by the controlling section, the driving means returns the display panel to its position before the application of the external force.

12. The monitor apparatus according to claim 1, wherein the controlling section causes the detecting means to measure a speed of the external force applied to the display panel and changes a movement speed of the display panel in accordance with the speed of the external force.

13. The monitor apparatus according to claim 1, further comprising warning means for issuing a warning when the detecting means detects that an external force is applied to the display panel.

14. The monitor apparatus according to claim 13, wherein, when the detecting means detects that the external force is applied to the display panel, the warning means outputs an alarm sound as the warning.

15. The monitor apparatus according to claim 14, wherein, when the detecting means detects that the external force is applied to the display panel, the warning means outputs the alarm sound until a preset time is reached.

16. The monitor apparatus according to claim 14, wherein, when the detecting means detects that the external force is applied to the display panel, the warning means outputs the alarm sound while the controlling section performs an operation for moving the display panel.

17. A monitor apparatus comprising:
a display panel adapted to be housed in a housed position;
driving means comprising a gear transmission mechanism for moving the display panel from the housed position to a deployed position, wherein the driving means drives the display panel to pivot to an upright position in a first operation, and for moving the display panel from the deployed position to the housed position, wherein the driving means drives the display panel to pivot from the upright position in a second operation;
detecting means for detecting whether an external force is applied to the display panel placed in the deployed position in a direction in which the driving means drives the display panel to pivot; and
a controlling section for, when the detecting means detects that such an external force is applied to the display panel placed in the deployed position, causing the driving means to drive the display panel to move in the direction in which the external force is applied;
wherein the detecting means detects whether an external force is applied in directions in which the display panel is pushed and pulled, and wherein, when an external force in the push direction is applied to the display panel, the detecting means detects that the external force in the push direction is applied and the controlling section causes the driving means to drive the display panel to pivot in the push direction, and when an external force in the pull direction is applied to the display panel, the detecting means detects that the external force in the pull direction is applied and the controlling section causes the driving means to drive the display panel to pivot in the pull direction.

18. The monitor apparatus according to claim 17, wherein the gear transmission mechanism comprises a first gear and a second gear, and the monitor apparatus further comprises a clutch for causing a slip when a load having a predetermined torque or more is applied, the clutch comprising a clutch-equipped gear provided between the first gear and the second gear; and the detecting means is associated with at least one of the gears.

19. The monitor apparatus according to claim 17, wherein when the external force is applied to the display panel in the deployed position, the controlling section causes the display panel to move in a preset range of angles or until a preset time is reached.

20. The monitor apparatus according to claim 19, wherein, after the display panel is moved by the controlling section in a preset range of angles or until the preset time is reached, the driving means returns the display panel to its position before the application of the external force.

21. The monitor apparatus according to claim 17, wherein the controlling section causes the detecting means to measure a speed of the external force applied to the display panel and changes a movement speed of the display panel in accordance with the speed of the external force.

22. The monitor apparatus according to claim 17, further comprising warning means for issuing a warning when the detecting means detects that an external force is applied to the display panel.

* * * * *